United States Patent Office 3,031,067
Patented Apr. 24, 1962

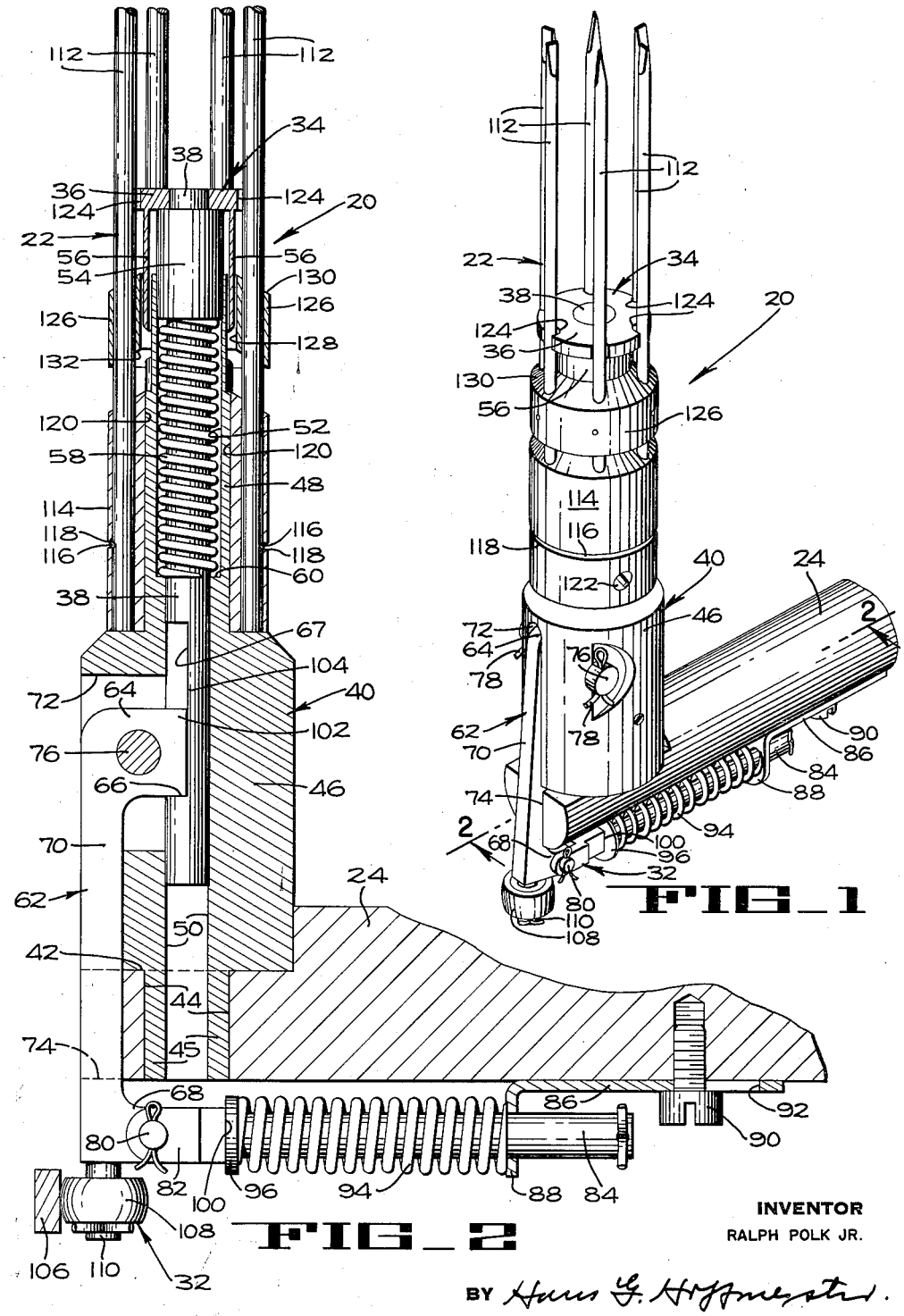

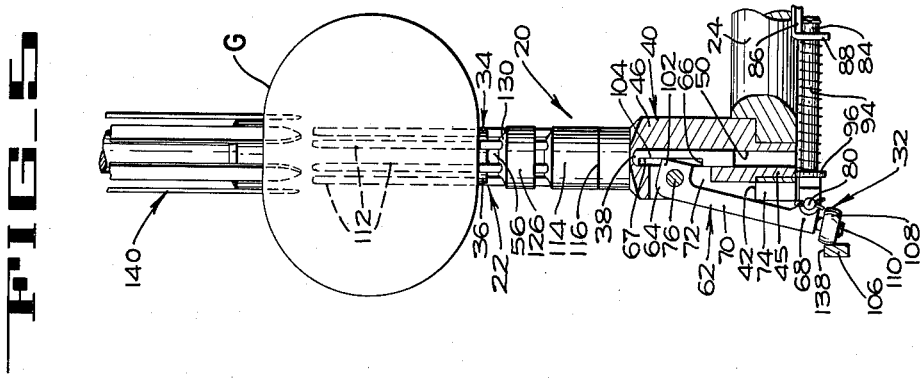
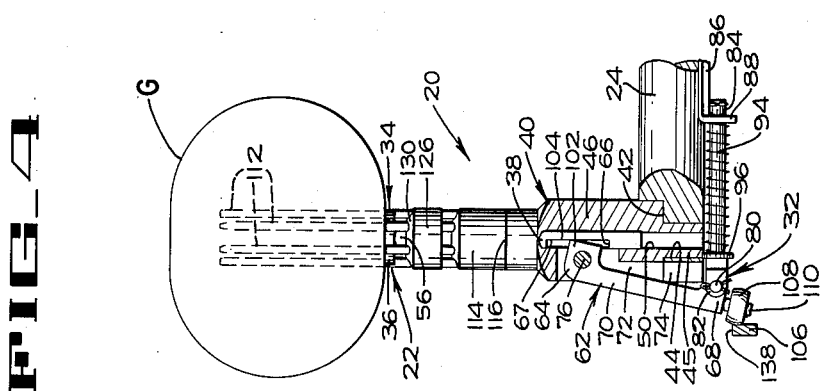
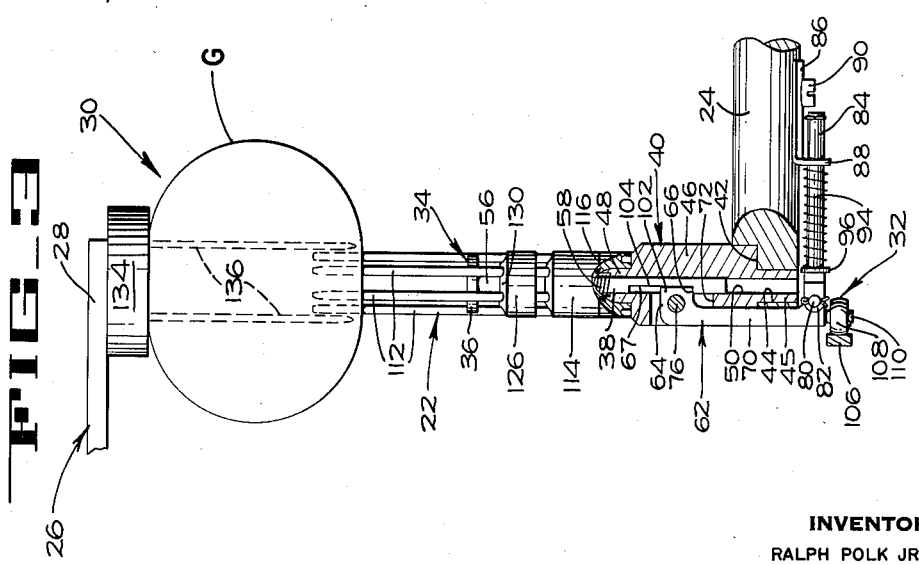

3,031,067
APPARATUS FOR PROCESSING FRUIT
Ralph Polk, Jr., Box 3208, Tampa, Fla.
Filed Feb. 9, 1960, Ser. No. 7,691
8 Claims. (Cl. 198—209)

The present invention pertains to apparatus for processing fruit and more particularly relates to a fruit support mechanism for holding fruit at a particular elevation in a fruit processing machine.

In fruit processing machines, it is usually necessary that the fruit to be processed is positioned in a precise location in the machine and is held or supported in this position in predetermined relation to various mechanisms for peeling, coring and the like.

In one citrus fruit processing machine, blades are moved downwardly into the upper end of the fruit prior to being moved laterally toward the radial membranes of the fruit. In order that the lower ends of the blades do not engage the seeds in the fruit, it is necessary that the blades penetrate only a short distance into the fruit. Since the blades move downward a fixed distance during each stroke, a blade that is set to properly penetrate small fruit will penetrate large fruit all the way to the seed cell if both large and small fruit are supported with their lower ends at the same level. However, it has been found that if the uppermost surface of each fruit is held at a predetermined elevation, the blade will penetrate the same distance into each fruit regardless of its size. The present invention therefore provides a positive support for holding fruit, both large and small, with their upper surfaces at a common level in a fruit processing machine.

Therefore, one of the objects of the present invention is to provide an improved fruit support mechanism for a fruit processing machine.

Another object is to provide an improved fruit support mechanism which includes a yieldable support member that is contacted and automatically positioned by a fruit, and will support the fruit in that position during subsequent processing operations thereon.

Another object of this invention is to provide a fruit support mechanism that is readily adaptable to a variety of different fruit processing machines.

Another object is to provide, for a fruit processing machine, a fruit support mechanism which will automatically adjust itself to accommodate fruit of a wide range of sizes.

Further objects and advantages of the present invention will become apparent from the following description and the accompanying drawings, in which:

FIGURE 1 is a perspective of the improved fruit support mechanism of the present invention.

FIGURE 2 is a vertical medial section of the fruit support mechanism of FIGURE 1 and is taken substantially along line 2—2 of FIGURE 1.

FIGURE 3 is a schematic elevation, partly broken away and partly in section, of the fruit support mechanism of the present invention, particularly showing a grapefruit as it is being positioned thereon.

FIGURE 4 is a schematic elevation, similar to FIGURE 3, but showing a grapefruit fully positioned on the support mechanism.

FIGURE 5 is a schematic elevation, similar to FIGURES 3 and 4, and particularly illustrating the operation of the support mechanism of the present invention in conjunction with the fruit sectionizing knives of a grapefruit processing machine.

The fruit support mechanism 20 of the present invention is adapted to be used in a grapefruit sectionizing machine of the type disclosed in my pending application for patent, Serial No. 730,298. However, this mechanism is not limited to use in that particular machine since its construction and operation make it readily adaptable to many other types of fruit processing machines in which the fruit, after positioning, must be held at a precise location upon impaling blades, in a fruit receiving pocket, in a clamp, or in similar fruit holders.

In one embodiment of the fruit support mechanism 20 (FIG. 1) of the present invention, the mechanism forms a part of a fruit carrier 22 which is provided to carry a grapefruit impaled thereon in a circular path around a main turret, not shown, of the processing machine of the previously identified Polk application. The main turret is provided with a plurality of the fruit carriers 22, each of which is fixed to an associated mounting arm 24 that projects radially from the main turret.

During operation of the grapefruit sectionizing machine, the fruit carriers 22 are intermittently indexed in 45° angular increments about the axis of the main turret. Adjacent the main turret is disposed a transfer turret 26, partially shown in FIGURE 3, which carries a plurality of grapefruit impaled thereon for transfer to the fruit carriers 22 of the main turret. The transfer turret is intermittently indexed in 90° increments and each of a plurality of arms 28 thereof, only one of which is shown, carries a whole peeled grapefruit in a path which, at a fruit transfer station 30, is directly above a fruit carrier 22 and its associated fruit support mechanism 20.

At the fruit transfer station 30, the transfer turret and the main turret are stopped in a position wherein the grapefruit carried by the arm 28 is in vertical alignment with the support mechanism 20 and its fruit carrier 22. The arm 28 of the transfer turret is then lowered a limited distance and the grapefruit is transferred to the fruit carrier 22 of the main turret. While the upper end of the fruit is being positioned at a precise predetermined horizontal level due to the limited downward movement of the arm 28 of the transfer turret, a member of the support mechanism 20 is contacted by the lower end of the fruit and is depressed. The support mechanism 20 functions in a manner to prevent any subsequent downward movement of the fruit when, at a later time, a plurality of knives are thrust downwardly into the grapefruit to a predetermined depth which must be accurately regulated for the proper functioning of the sectionizing machine.

Included in the fruit support mechanism 20 (FIGS. 1 and 2) is a spring urged cam follower assembly 32 and a yieldable fruit support member 34. The fruit support member 34 comprises a disc 36 which is fixed on the upper end of a locking rod 38 that is mounted for vertical sliding movement in a vertically positioned tubular mounting post 40 which extends upwardly from a flat outer end portion 42 of the mounting arm 24. A bore 44 extends vertically through the end portion 42, and a lower projection 45 of the tubular mounting post 40 is secured in the bore 44 by any suitable means, such as welding. The tubular mounting post 40 includes a hub portion 46 and a smaller upper neck portion 48, both of which are integrally formed. A bore 50 extends axially through the lower end 45, the hub portion 46, and partly into the neck 48 wherein it is enlarged into a counterbore 52.

The fruit support locking rod 38 (FIG. 2), which has a cylindrical block 54 integrally formed near its upper end, is slidably disposed in the bore 50, and the lower end portion of the block 54 is received for vertical sliding movement within the upper end of the counterbore 52. A tubular juice shield 56 depends from the fruit support disc 36 and is telescoped over the upper end of the neck portion 48 to prevent fruit juices from entering the tubular mounting post 40. The fruit support disc 36 is urged upwardly by a compression spring 58 which is mounted on the locking rod 38 in the counterbore 52 and is held in compression between the bottom end of the block 54 and a shoulder 60 formed between the bore 50 and the counterbore 52.

The upward movement of the locking rod 38 is limited by a locking member 62 (FIGS. 1 and 2) which has an upper end portion 64 that extends toward the turret and overlies a shoulder 66 formed by an elongate semi-cylindrical recess 67 provided in the locking rod 38 near its lower end. The locking member 62 is of generally C-shaped configuration having an inwardly turned lower end 68, an elongate body section 70 and the above-mentioned upper end 64. A vertically disposed radial slot 72 is formed in the outer wall of the mounting post 40 and a slot 74, having walls coplanar with the slot 72, is formed in the outer end of the mounting arm 24. The locking member 62 is disposed in the aligned slots 72, 74 and a pivotal mounting for the lock 62 is provided by a pivot pin 76 which extends through the upper end 64 and through the mounting post 40 wherein it is retained by cotter pins 78. The lower end portion 68 of the lock 62 is pivotally connected by a pivot pin 80 to a bifurcated outer end 82 of a spring mounting rod 84.

The spring mounted rod 84 is held in spaced parallel relation beneath the mounting arm 24 by an angle clip 86 which has a depending flange 88 that slidably journals the rod 84 near its inner end. The position of the clip 86 may be adjusted by means of a mounting screw 90 which extends through a slot 92 in the clip 86 and is threaded into the mounting arm 24. A compression spring 94 is disposed on the rod 84 between a washer 96 that abuts a face 100 of the bifurcated end 82, and the flange 88 of the angle clip 86, whereby the lock member 62 is urged to pivot about its pivot pin 76 in a direction moving an upper corner portion 102 of its upper end 64 toward a vertical wall 104 forming the base of the recess 67 in the locking rod 38.

At the time a fruit is first placed on the fruit carrier 22 (FIGS. 2 and 3) of the fruit support mechanism 20, the upper end 64 of the locking member 62 is held out of contact with the vertical wall 104 in the locking rod 38 by means of a stationary, lock-actuating cam strip 106 which is engaged by a cam roller 108 that is rotatably mounted upon a rod 110 depending from the lock 62. Portions of the cam strip 106 are spaced at different distances from the axis of the main turret in order to move the lock 62 to either allow the disc 36 to yield from a fruit being positioned on the carrier 22 or to lock the disc 36 after the fruit has been fully positioned on the carrier. The cam 106 may be in the form of a continuous strip which extends completely around the main turret of the grapefruit sectionizing machine, or it may be formed in segments appropriately spaced about the axis of the main turret to actuate the lock 62 of the fruit support mechanism 20 at the proper times.

The fruit carrier 22 comprises a plurality of impaling prongs 112 (FIG. 2) that extend vertically upward from a mounting hub 114, and are adapted to carry an impaled grapefruit through the several processing stations spaced around the main turret of the machine. Each prong 112 is retained in an aperture of the hub 114 by a wire lock 116 which is disposed in a circumferential groove 118 that is cut into the hub and into the outer surfaces of the prongs. A central bore 120 of the hub receives the tubular neck 48 of the fruit support mechanism 20, and the hub 114 is secured to the neck 48 by a set screw 122 (FIG. 1) in a position wherein its lower end abuts the upper end of the central portion 46 of the mounting post 40. Each prong 112 has a sharpened upper end and extends upwardly through one of a plurality of peripheral recesses 124 provided in the fruit support disc 36 to prevent rotation of the disc and the locking rod 38 to which it is secured.

In order to prevent the fruit juices that are released from the grapefruit during impaling from causing the locking rod 38 (FIG. 2) to become stuck fast, a drip shield 126 is disposed on the prongs 112 at a point between the fruit support disc 36 and the hub 114. The shield 126 is in the form of an annulus having a central bore 128 in which the tubular juice shield 56 is slidably disposed, and having a beveled upper corner 130 for guiding the juices away from the bore 128. Likewise, the underside of the drip shield 126 is provided with an upwardly and inwardly inclined surface 132 so that the juices are guided away from the mounting post 40.

FIGURE 3 illustrates a grapefruit G in a position it assumes during its movement from the transfer turret arm 28 to the impaling prongs 112 of the fruit carrier 22. A mounting ring 134 is fixed to the outer end of the arm 28 of the transfer turret 26, and to the ring 134 are secured four depending prongs 136, only two of which are shown, upon which the impaled fruit is carried in a circular path on the transfer turret. When the grapefruit is in vertical alignment with the fruit carrier 22 after the main turret and the transfer turret 26 have been indexed and stopped, the arm 28 is caused to lower a preset distance to impale the grapefruit upon the prongs 112. At this particular time the cam 106 is holding the end 64 of locking member 62 out of engagement with the rod 38.

When the arm 28 has descended the full limit of its travel, the grapefruit attains the position illustrated in FIGURE 4. During the downward movement of the grapefruit on the impaling prongs 112, the bottom of the fruit contacts the yieldable fruit support disc 36 and forces it downwardly against the pressure of the compression spring 58. After the grapefruit has been fully positioned on the fruit carrier 22 to place its upper end in the predetermined horizontal plane previously mentioned, the arm 28 is raised to withdraw the prongs 136 from the upper end of the grapefruit while it is held fixed upon the impaling prongs 112 by a clamping ring, not shown.

After the withdrawal of the prongs 136 (FIGS. 4 and 5) from the upper portion of the fruit, the main turret rotates another 45°, the transfer turret 26 another 90°, and the lock actuating cam 106, by means of a locking portion 138 that is displaced further away from the main turret, permits the cam follower roller 108 to move outwardly and thereby cause the lock member 62 to be pivoted by the spring 94 until its upper corner portion 102 contacts the vertical wall 104 of the recess 67 in the locking rod 38. As a result of the force provided by the spring 94, and the lock member's body portion 70 which acts as a long lever to apply that force, the corner portion 102 engages the vertical wall 104 with considerable pressure. This engagement of the lock member 62 and the locking rod 38 is firm enough to assure that neither vibration nor any other force will cause any relative movement therebetween until the lock member 62 is pivoted inwardly by the cam 106 at a later point in the cycle.

When the main turret has indexed the fruit support mechanism 20 to a station where a knife assembly 140 (FIG. 5) is thrust down a limited distance into the grapefruit, the lock member 62 continues to immobilize the locking rod 38 and the fruit support disc 36 mounted thereon. In this manner the desired penetration of the fruit by the knife assembly 140 is controlled because the upper end of each grapefruit, regardless of its size, is always positioned in the same horizontal plane by the transfer turret arm 28, and the fruit support mechanism 20 of the present invention positively maintains the fruit at that particular level.

The simple construction of the fruit support mechanism of the present invention permits it to be easily adapted to other fruit processing machines which require that the fruit is disposed in fixed relation to its carrier prior to any processing operations being performed thereon. Of course the fruit support mechanism of the present invention and its associated fruit carrier need not be moved through the processing stations of a fruit processing machine in order to function. Some fruit processing machines use stationary fruit holders, and in use with this type of processing machine the fruit support of the present invention may be mounted in the fruit holder and actuated by a movable cam.

It will be understood that variations and modifications of the present invention may be made without departing from its novel concept and I deem myself entitled to all such modifications and variations thereof as come within the scope of the appended claims.

Having thus described my invention, what I claim as new and desire to protect by Letters Patent is:

1. A turret mounted fruit support mechanism comprising a fruit carrier for holding fruit, a fruit support member mounted for vertical reciprocating movement in said carrier, said support member having an upwardly facing support surface arranged to be contacted by and moved to a lower elevation by a fruit positioned on said carrier in one sector of the turret, and locking means mounted on said carrier and engageable at a different sector of the turret with said support member for locking said member to said carrier.

2. A fruit support mechanism comprising a fruit carrier for holding fruit, yieldable fruit support means mounted in said carrier and having an upwardly facing support surface arranged to be contacted and moved by a fruit placed in said carrier to a predetermined position governed by the size of the fruit, locking means mounted on said carrier and engageable with said fruit support means for locking said fruit support to said carrier in said predetermined position, and means for actuating said locking means when a fruit is positioned on said support means for preventing movement of said fruit support means in said carrier.

3. In a fruit processing machine, the combination of a turret, fruit carrier means connected to said turret for movement therewith, a fruit support disc mounted on said fruit carrier means and having an upwardly facing support surface arranged to be contacted and depressed from an elevated position by a fruit placed thereon, a locking rod connected to said fruit support disc for simultaneous movement therewith, a lock pivoted to said fruit carrier means and engageable with said locking rod for preventing the relative movement of said fruit support disc and said carrier, lock actuating means connected to said lock for pivoting it into engagement with said locking rod, and lock releasing means engaged with said lock for pivoting said lock out of engagement with said locking rod whereby said fruit support disc is free to return to said elevated position and to yield from the force of another fruit moved thereagainst.

4. In a fruit processing machine, the combination of a fruit carrier mounted for rotative movement with a turret, fruit support means mounted for vertical movement on said carrier and having an upper support surface arranged to be contacted and depressed by a fruit placed on said carrier, friction locking means mounted on said fruit carrier and frictionally engageable with said fruit support means for immobilizing said support means with respect to said carrier, resilient lock actuating means mounted on said fruit carrier and connected to said locking means for the actuation thereof into locking engagement with said fruit support means, and cam means for releasing said locking means from engagement with said fruit support means in accordance with the rotative position of said carrier.

5. A fruit support mechanism for a fruit processing machine comprising mounting means secured to a turret of said machine for movement therewith, a locking rod mounted for sliding movement in said mounting means, a fruit support disc having an upwardly directed fruit support surface, said disc being secured to said locking rod and arranged to be moved by a fruit placed thereagainst to a predetermined position regulated by the size of the fruit, a lock member mounted on said mounting means and engageable with said locking rod for locking said fruit support disc in said predetermined position, resilient means urging said lock member into engagement with said locking rod, and a cam for releasing said lock member in accordance with the rotative position of the turret and releasing said resilient means in order to lock said disc in said predetermined position, whereby movement of the fruit against said fruit support disc is prevented subsequent to said fruit support disc positioning.

6. A fruit support mechanism for a fruit processing machine comprising a fruit carrier secured to a turret of said machine for movement therewith, a locking rod slidably mounted in said carrier, a fruit support disc having an upwardly facing fruit support surface, said disc being mounted on said locking rod and arranged to be slid in said carrier by a fruit placed on said carrier to a predetermined position regulated by the size of the fruit, a lock engageable with said locking rod and mounted on said carrier for holding said fruit support at a predetermined position, a cam engaged with said lock at one sector of the turret for releasing said lock from engagement with said locking rod according to the rotative position of said fruit support mechanism and the turret, and resilient actuating means connected to said lock for locking said fruit support when said cam and said lock are disengaged and thereby preventing movement of said fruit support in a direction either toward or away from the fruit.

7. A fruit support mechanism for a fruit processing machine comprising a mounting arm secured to a turret of the machine for intermittent rotation therewith, a fruit carrier mounted on said mounting arm for carrying fruit impaled thereon when the turret is rotated, yieldable fruit support means having an upwardly facing fruit support surface, said support means being mounted in said carrier and arranged to be depressed by a fruit impaled on said carrier, locking means mounted on said mounting arm and arranged to engage and immobilize said fruit support means, spring actuating means connected to said locking means, and a cam arranged to be engaged by said locking means during rotation of said turret for actuating said locking means according to the rotative position of the turret.

8. A fruit support mechanism for a fruit processing machine having a turret movable through a plurality of fruit processing stations, said mechanism comprising a mounting arm connected to said turret for coextensive movement therewith, a fruit support disc carried by said mounting arm and having an upwardly facing fruit support surface, a locking rod connected to said fruit support disc and arranged to be immobilized in respect to said mounting arm at selected times while carried thereby, resilient locking means frictionally engageable in a first position with said locking rod for immobilizing said fruit support disc and movable to a second position for allowing said fruit support disc to yield under a fruit moved thereagainst, and a cam engageable by said locking means during rotation of said turret and having a first camming surface arranged to move said locking means to said first position and a second camming surface for moving said locking means to said second position whereby after fruit has been positioned against said fruit support disc said locking means is moved to said first position to immobilize said disc and prevent any subsequent yielding movement of said fruit and at a subsequent processing station said locking means is moved to said second position to allow said support disc to resume its initial position after the fruit is removed therefrom.

References Cited in the file of this patent

UNITED STATES PATENTS

| | | |
|---|---|---|
| 2,120,052 | Bishop | June 7, 1938 |
| 2,246,896 | Polk et al. | June 24, 1941 |